(12) United States Patent
Mrofka et al.

(10) Patent No.: US 7,237,792 B2
(45) Date of Patent: Jul. 3, 2007

(54) PROTECTIVE CUSHION FOR A TRAILER HITCH OR THE LIKE

(76) Inventors: Robert J. Mrofka, 1450 N. Astor, #15A, Chicago, IL (US) 60610; Ted Kowalski, 8656 N. Ozanam, Niles, IL (US) 60714

( * ) Notice: Subject to any disclaimer, the term of this patent is extended or adjusted under 35 U.S.C. 154(b) by 0 days.

(21) Appl. No.: 10/870,332

(22) Filed: Jun. 17, 2004

(65) Prior Publication Data

US 2005/0280246 A1    Dec. 22, 2005

(51) Int. Cl.
  *B60D 1/60*        (2006.01)
  *B60D 1/58*        (2006.01)
(52) U.S. Cl. .................. 280/507; 280/432; 293/117
(58) Field of Classification Search ............... 280/432, 280/507; 293/117
  See application file for complete search history.

(56) References Cited

U.S. PATENT DOCUMENTS

| | | | |
|---|---|---|---|
| 3,853,255 A | 12/1974 | Spencer | |
| 4,202,562 A | 5/1980 | Sorenson | |
| 4,413,835 A * | 11/1983 | Hazelett | ............ 280/204 |
| 4,484,759 A * | 11/1984 | Zwick | ............ 280/460.1 |
| 4,597,603 A * | 7/1986 | Trabert | ............ 296/193.1 |
| D374,645 S | 10/1996 | Hanson et al. | |
| 5,570,826 A | 11/1996 | Garbes et al. | |
| 6,039,227 A | 3/2000 | Stark | |
| 6,099,035 A | 8/2000 | Garvin, III | |
| 6,158,726 A * | 12/2000 | Coleman et al. | ............ 267/292 |
| 6,254,118 B1 * | 7/2001 | Dudley | ............ 280/432 |
| 6,511,088 B2 | 1/2003 | Kahlstorf | |
| 6,913,277 B2 * | 7/2005 | Mrofka et al. | ............ 280/491.5 |

* cited by examiner

*Primary Examiner*—Lesley D. Morris
*Assistant Examiner*—Marlon Arce-Diaz
(74) *Attorney, Agent, or Firm*—Olson & Hierl, Ltd.

(57) ABSTRACT

This invention relates to a protective cushion assembly that is adapted to protect equipment involved with vehicle towing, particularly the towing vehicle's rear bumper which contemporarily may be comprised of plastic. The cushion assembly includes an elastomeric plastic body and an associated bracket means for fastening the plastic body to an arm member that extends outwardly from the location of a vehicle-associated trailer hitch. The cushion and the bracket means can each be embodied in various forms and constructions. Combinations of the cushion assembly with various arms are disclosed. The arm preferably is a transversely extending, horizontally oriented, elongated cross bar that extends across and medially adjoins the rear end of a tow bar, more preferably the cross bar is part of a trailer hitch extension.

24 Claims, 6 Drawing Sheets

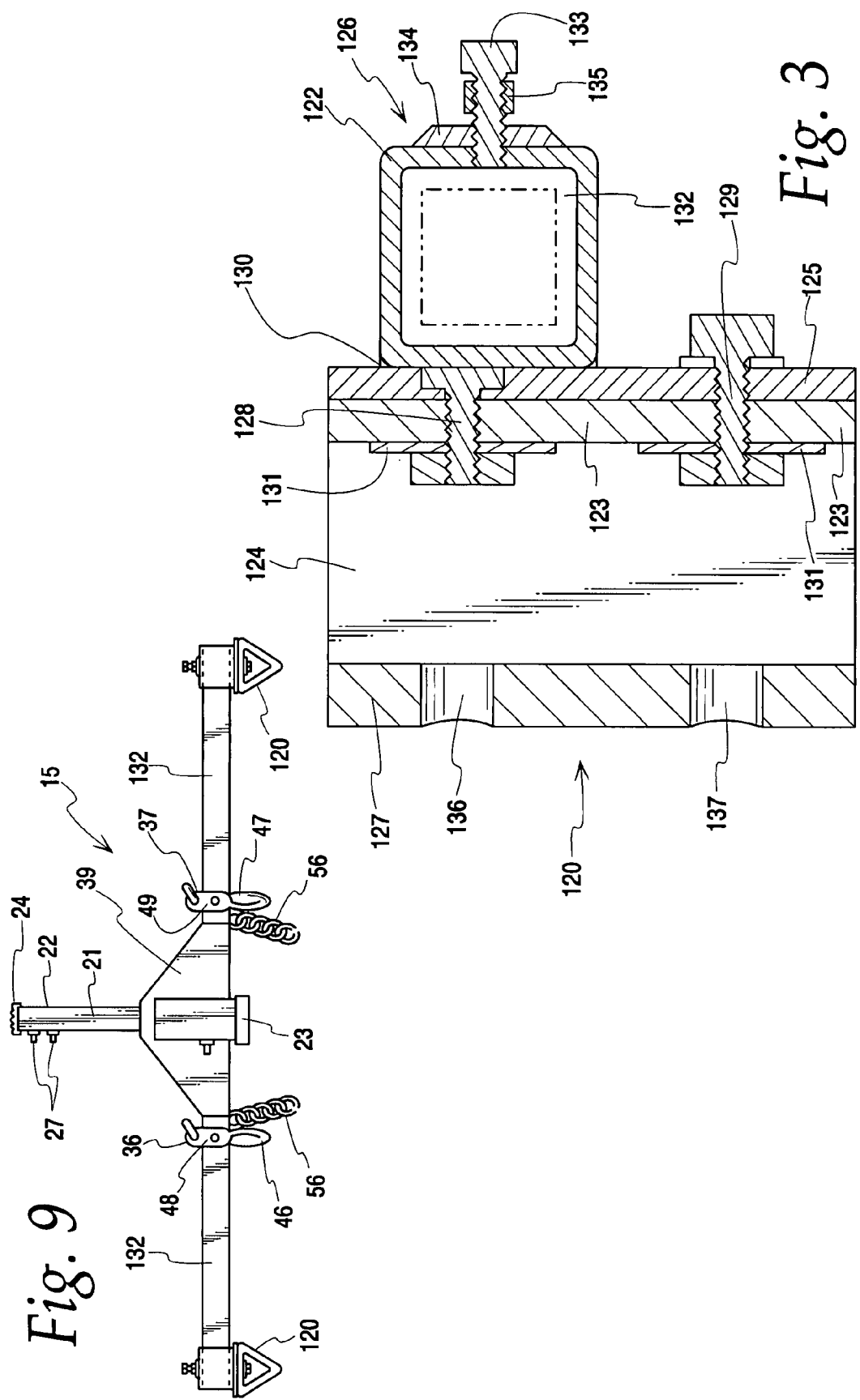

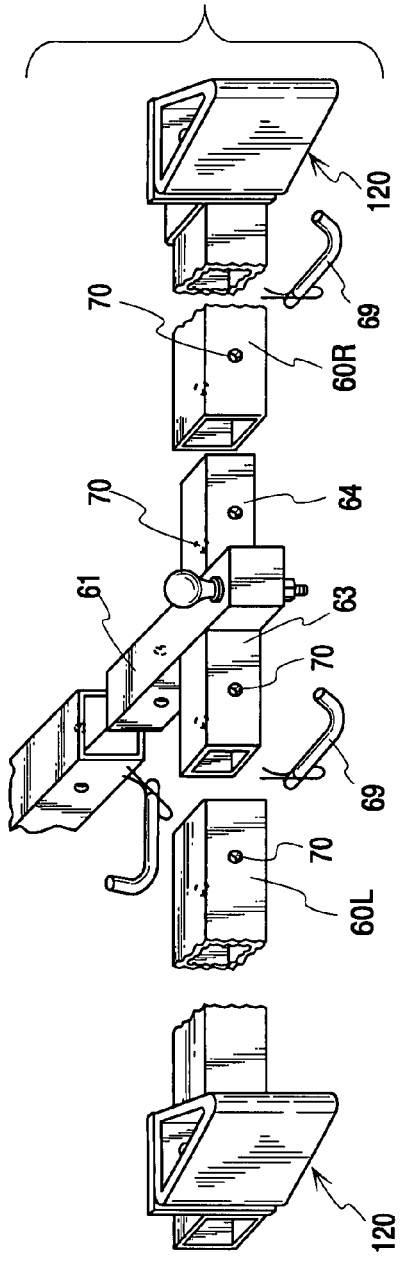
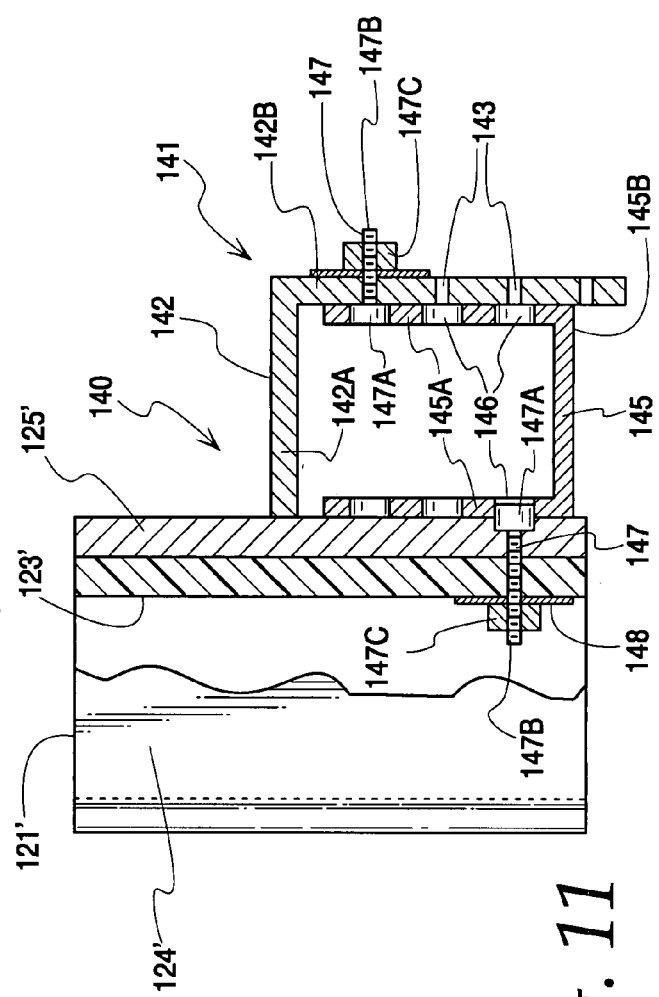
Fig. 10
Fig. 11

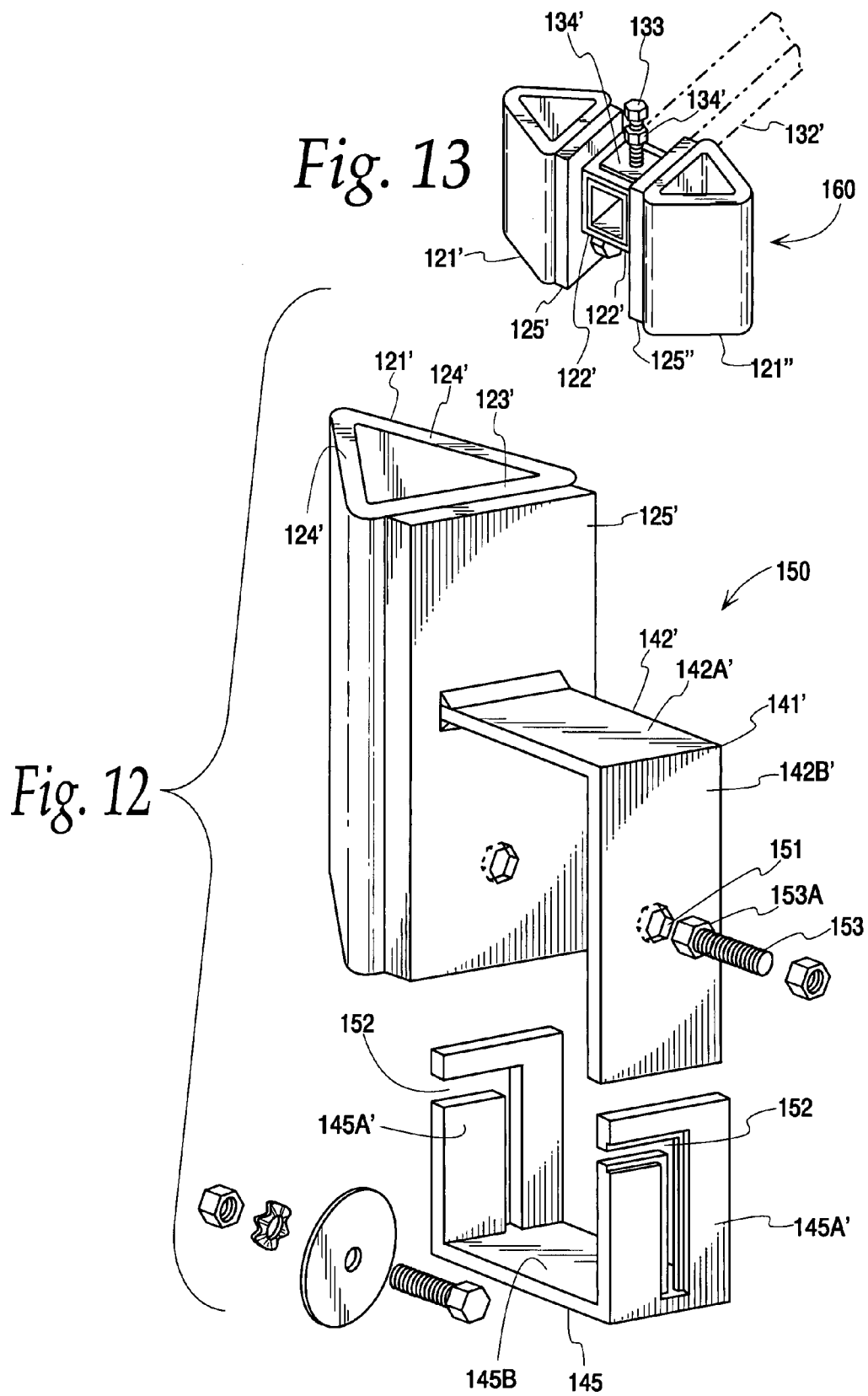

PROTECTIVE CUSHION FOR A TRAILER HITCH OR THE LIKE

RELATED APPLICATION

This application relates to copending U.S. patent application Ser. No. 10/615,315 filed Jul. 8, 2003 entitled Towing Hitch Extension.

FIELD OF THE INVENTION

This invention relates to protective cushions, and more particularly to a vehicular protective cushion assembly that is associatable with an arm member which laterally extends outwardly from a vehicular towing hitch location, for protecting equipment from possible impacts.

BACKGROUND OF THE INVENTION

When a vehicle towing a trailer or the like is backed up, undesired and unintended contact can occur between the trailer and the rear of the vehicle.

This can occur when a relatively sharp angle develops between the rear bumper of the vehicle and the forward end portion of the trailer. Impact or contact between the trailer and the bumper of the vehicle can mar or dent the bumper, which is often made of plastic. Even though such damage is usually relatively minor or only slightly disfiguring, it can be expensive to repair and it can detract from the appearance of the vehicle.

Previously, we developed a very effective towing hitch extension as shown and described in our copending application Ser. No. 10/615,315, the content and disclosure of which are fully incorporated herein by reference. That towing hitch extension is attached to a towing hitch and is adapted to protect the rear bumper of a towing vehicle. Yet, even when a trailer hitch is associated with such a towing hitch extension, minor vehicular component damage as described above can still sometimes occur.

It would be desirable to avoid such damage by providing a protective cushion assembly which can absorb the energy of relatively minor impacts between the vehicle bumper and the trailer during operation or use of a towing hitch.

We have now found that such damage can be avoided by a new and very useful protective cushion assembly that is preferably located in spaced, adjacent relationship relative to a towing hitch.

SUMMARY OF THE INVENTION

This invention relates to a vehicular protective cushion assembly that is adapted to protect equipment components that are adjacent to a towing hitch including, for example, the towing vehicle's rear bumper which is contemporarily commonly comprised of plastic and also the towed vehicle's forwardly extending supports for the hitch ball mount assembly.

The inventive protective cushion assembly includes a rubber or elastomeric plastic body, preferably an associated backing plate for the plastic body, and a mounting bracket. A supporting arm member is preferably provided along with arm connection means for the arm member. The supporting arm member is adapted to extend laterally outwardly from the vicinity of the towing hitch. The elastomeric plastic body, particularly as positioned by, or relative to, the supporting arm member, is adapted to cushion impacts and absorb impact energy of equipment component portions that may be brought into contact therewith during a towing operation particularly when and if an angle develops between the towing vehicle and the towed vehicle which is sufficient to cause contact between adjacent equipment components.

A supporting arm member for the cushion assembly can comprise an arm member, or portion of an arm member, such as commonly exists in the vicinity of a towing hitch. Thus, the supporting arm member may function mainly to position the cushion assembly and also it may function in another or other ways. Depending upon the circumstances and the application or use environment for a particular cushion assembly, examples of such existing supporting arm members or arm member portions include a towing vehicle's rear bumper, a forwardly extending arm member employed in the support and positioning of a towed vehicle's hitch ball mount assembly, a towing hitch extension (presently preferred), or the like.

Both the protective cushion assembly and combinations thereof with a supporting arm member are believed to be novel and patentable.

One presently preferred inventive combination is that of a protective cushion assembly with a transversely extending, horizontally oriented, elongated supporting arm member (or cross-bar) of a towing hitch extension, such as previously provided by us. Such a supporting arm member and associated towing hitch extension preferably have a structure such as disclosed in our copending, above indicated U.S. patent application.

Our present protective cushion assembly, as those skilled in the art will readily appreciate from our present disclosure, can be variously comprised and formed.

Other and further objects, aims, features, objectives, purposes, embodiments and the like will be apparent to those skilled in the art from the following description, the associated drawings, and the appended claims.

BRIEF DESCRIPTION OF THE DRAWINGS

In the drawings:

FIG. 3 is an enlarged longitudinal medial section taken through the protective cushion assembly of FIG. 1;

FIG. 9 is a top plan view of the FIG. 1 towing hitch extension with the two associated protective cushion assemblies, the towing hitch extension being shown in phantom;

FIG. 10 is a perspective view of two protective cushion assemblies as in FIG. 1 where each are in functional association with a respective different opposite end portion of an alternative supporting arm, this arm being segmented and in association with a towing hitch, parts of the supporting arm arrangement being broken away to conserve drawing space;

FIG. 11 is a view similar to FIG. 3 but showing an alternative embodiment of the protective cushion assembly with the elastomeric plastic body partially broken away;

FIG. 12 is an enlarged, partially exploded view of another alternative embodiment of the protective cushion assembly;

FIG. 13 is a perspective view of another alternative embodiment of the protective cushion assembly, this embodiment having two opposed cushion members.

DETAILED DESCRIPTION

Figure 1:
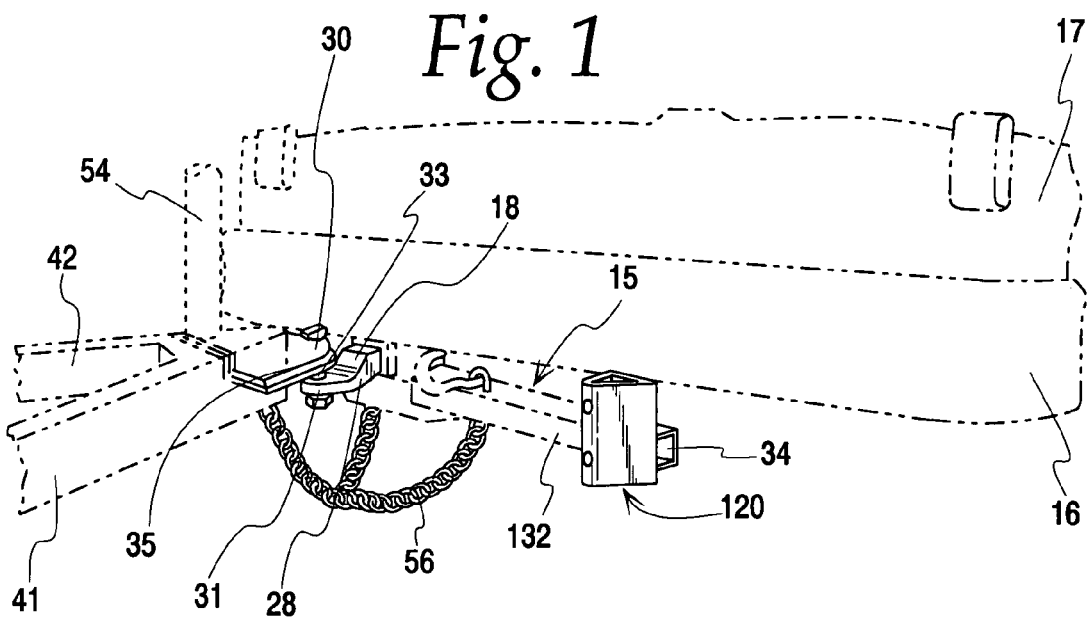
FIG. 1 is an environmental perspective view of a presently preferred embodiment of a protective cushion assembly of the present invention, this embodiment being shown in functional association with an end region of a supporting arm, the supporting arm being part of a towing hitch extension, the towing hitch extension being in functional association with a rear towing hitch of a towing vehicle (not detailed) and the ball of the towing hitch being in functional association with a hitch ball mount assembly that is in functional association with a towed vehicle (not detailed), the associated equipment components being shown in phantom.
Figure 2:
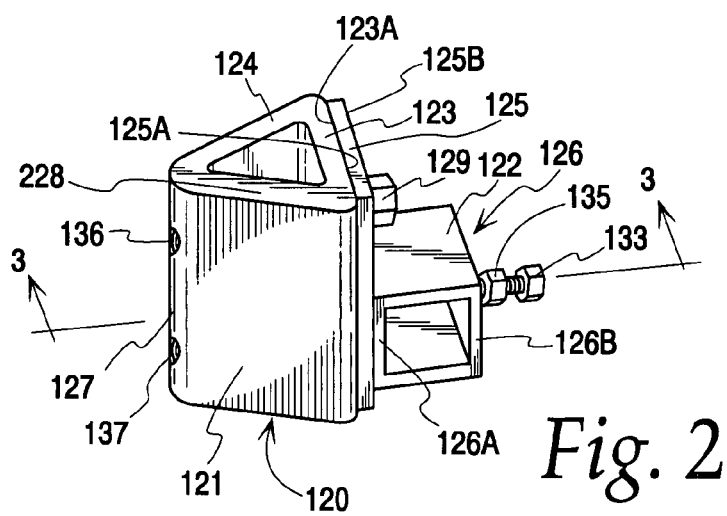
FIG. 2 is a perspective view of the protective cushion assembly of FIG. 1.
Figure 4:
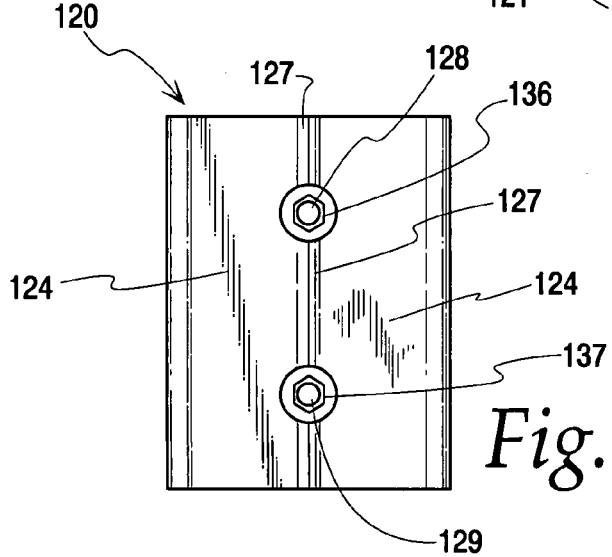
FIG. 4 is a front elevational view of the protective cushion assembly of FIG. 1.
Figure 5:
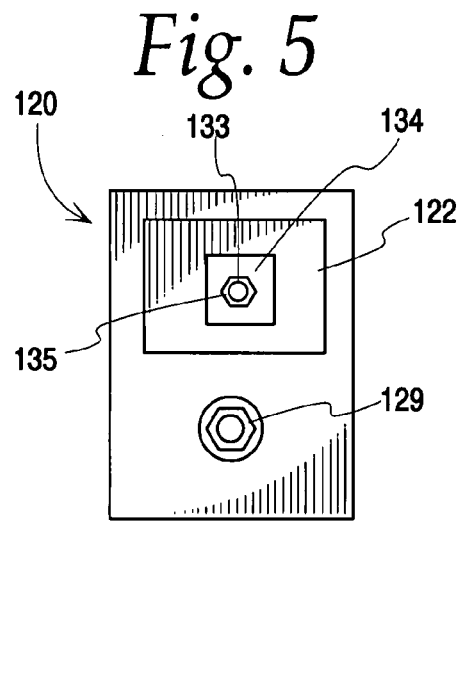
FIG. 5 is a back elevational view of the protective cushion assembly of FIG. 1.
Figure 6:
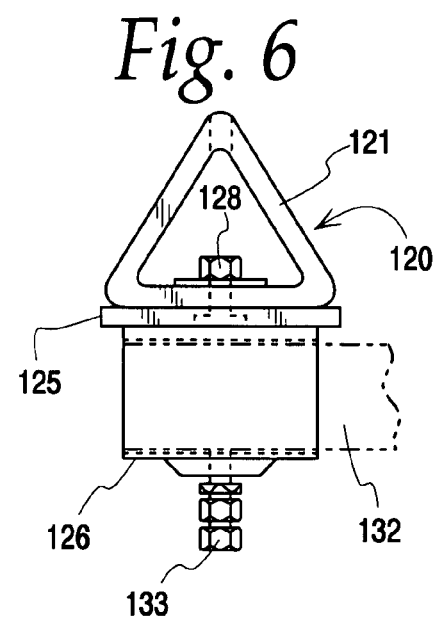
FIG. 6 is a top plan view of the FIG. 1 combination showing the opposite end region of the supporting arm in association with a second protective cushion assembly of the type shown in FIG. 1, the supporting arm being fragmentarily shown in phantom.
Figure 7:
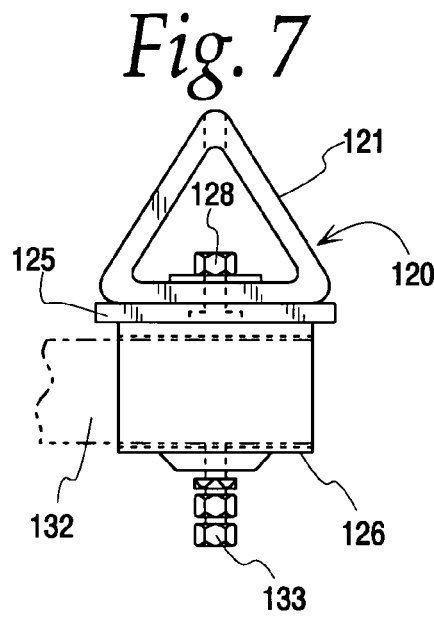
FIG. 7 is a bottom plan view of the protective cushion assembly of FIG. 1 in combination with the supporting arm, the supporting arm being fragmentarily shown in phantom.

Referring to the drawings, FIGS. 1–10 show a presently preferred embodiment 120 of a vehicular protective cushion assembly that is adapted for locating and protecting adjacent apparatus in the vicinity of a towing hitch from minor impacts thereagainst such as may occur when a towed vehicle (not detailed) that has a hitch ball connector 30 which is connected to the rear towing hitch 18 of a towing vehicle 17.

As shown, for example, in FIGS. 1–4, the protective cushion assembly 120 preferably incorporates an elastomeric plastic body 121, a mounting sleeve bracket 126, and, preferably, a base plate 125 located between the plastic body 121 and the sleeve bracket 126. The bracket 126 and the base plate 125 can each be comprised of a rigid plastic or metal (preferred).

The elastomeric plastic body 121 is preferably unitarily formed and can have various configurations and compositions. Conveniently, and as shown, preferably the plastic body 121 is comprised of a plastic composition which is relatively rigid but is distortable by impact, is resilient and is shock absorbing in response to impact. Various conventional rubber formulations can be employed. A present preference is to employ an elastomeric plastic body 121 which is hollow, uniformly elongated and unitarily formed (molded) and which is cross-sectionally generally equilaterally triangularly configured with generally thickened opposite side walls 124 (paired) and a base wall 123 and with a longitudinally extending (relative to the configuration of the body 121) apex region 127. The walls 124 and 123 as illustrated each have approximately equal rectangular configurations when viewed exteriorly, all as shown, for example, in FIGS. 2, 6 and 7. The side walls 124 and the base wall 123 are generally preferably flattened when relaxed (and not distorted or impacted).

The optional but preferred base plate 125 preferably is thickened and flattened, and has a rectangular perimeter configuration that is sized to be generally similar to the exterior perimeter dimensions of the base 123. The outer face 125A of the base plate 125 is positioned adjacent to the exterior side 123A of the base 123. The base plate 125 and the base 123 are preferably mounted together in face to face engagement (as shown) preferably by means of two longitudinally spaced (relative to the base plate 125 and the base 123) nut and bolt assemblies 128 and 129 that each extend through respective aligned holes provided in the base 123 and the base plate 125. Various alternative and other fastening means can be employed, if desired, such as an adhesive (not shown), a combination of mechanical (such as rivets, not shown) and adhesive fastening means, or the like.

The inside face 125B of the base plate 125 (that is, the face opposed to the outer face 125A of base plate 125) is connected in face to face engagement with an outside face of one side portion 126A of the sleeve 122 of the sleeve bracket 126. A fixed connection between the face 125B of the plate 125 and the adjacent side 126A of the sleeve bracket 126 is preferably accomplished by weldments 130 when metal components are involved, or by heat sealing or adhesive when plastic components are involved. The sleeve 122 can have various configurations, but is preferably cross-sectionally square and somewhat elongated. The side 126B that is opposed to side 126A in sleeve 122 is provided with a set bolt 133 that threadably extends perpendicularly through a receiving orifice or bore defined in the side 126B. Preferably, about the exterior region of this threaded bore in side 126B, a reinforcing plate or washer 134 (see FIG. 5) is mounted by welding or the like to increase the length of the threaded surface region for engagement with the set bolt 133. The bolt 133 is preferably provided along its shank with a threadably associated set nut 135 to permit one, if desired, to more firmly fix the position of the set bolt 133 in the side 126B. Preferably, the sleeve bracket 126, the plate 134, the set bolt 133 and set nut 135 are each comprised of metal (preferred) or rigid plastic. Preferably, the metal used in an embodiment of a cushion assembly 120 is substantially non-corrodible, such as aluminum, a stainless steel, an alloy, a chrome plated or painted steel, or the like.

Figure 8:
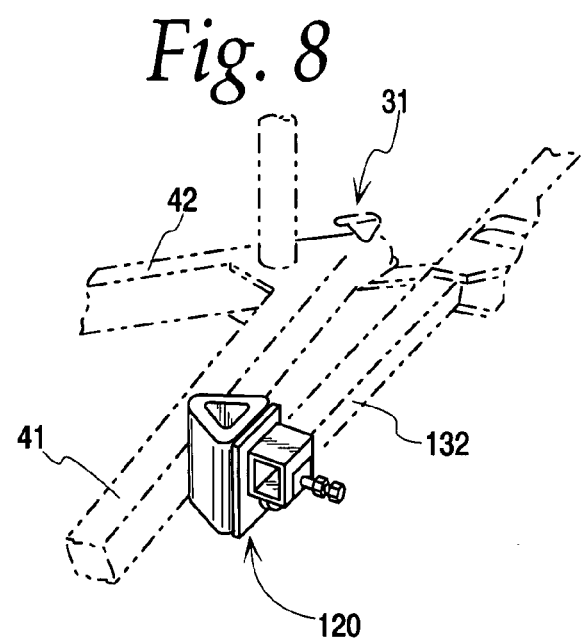
FIG. 8 illustrates the functional operation of the protective cushion assembly of FIG. 1 when, in the combination shown in FIG. 1, the towing vehicle has been turned at an angle relative to the towed vehicle to an extent such that the cushion of the protective cushion assembly of FIG. 1 abuts against one of the support and positioning arm members of the towed vehicle hitch ball mount assembly, the associated equipment components being shown in phantom as in FIG. 1.

The inside (or interior) dimensions of the sleeve 122 are preferably such as to permit the sleeve bracket 126 to engage and slidably extend over portions of a preferably cross-sectionally square arm, such as the supporting arm 132 in FIGS. 1, 8 and 9. Conveniently, when the sleeve bracket 126 is in a desired position along the arm 132, one advances by rotation the set bolt 133 through the side 122B of sleeve bracket 126, thereby fixing the end of the set bolt 133 against a portion of a slidably associated arm, such as the supporting arm 132.

The head of the bolt of the nut and bolt assembly 128 is preferably recessed and received in a fixed position in the base plate 125. In the recess, the head of the bolt can optionally be fixed by welding, if desired. The bolt of the assembly 128 is fixed in position before the sleeve 122 is mounted against the plate 125, thereby leaving the adjacent interior region of the sleeve bracket 126 smooth and open without any inside obstruction or the like.

To resist and prevent the base wall 123 of the plastic body 121 from pulling away from the base plate 125 during an impact, large outer diameter washers 131 are preferably placed around each of the bolts of the respective nut and bolt assemblies 128 and 129. To facilitate mounting and tightening (torquing) of the nut and bolt assemblies 128 and 129 when the base plate 125 is joined to the base wall 123, the apex 127 of the body 121 is preferably provided with apertures 136 and 137 which are each aligned with a different one of the respective holes in the base wall 123 through which the bolts of these nut and bolt assemblies 128 and 129 are extended, the apertures 136 and 137 being preferably sized to have extended therethrough shank portions of a socket wrench member (not detailed), or the like.

It is presently preferred to associate at least one, and more preferably two, protective cushion assembly embodiments 120 with one embodiment 126 being associated with each opposite end of a supporting arm 123 of a towing hitch extension 15 which is preferably as disclosed and described in our copending U.S. Ser. No. 10/615,315, as more particularly described and illustrated, for example, in FIGS. 1 and 9. The towing hitch extension 15 is preferably comprised of metal components and is adapted to protect the rear bumper 16 of a towing vehicle 17 having a rear towing hitch 18 to which the towing hitch extension 15 is attached, as now explained.

The towing hitch extension 15 as shown, for example, in FIG. 9, incorporates a somewhat elongated, preferably longitudinally straight, tow bar or arm 21 having a front end 22 and a rear end 23. The tow bar 21 extends generally longitudinally relative to the towing vehicle 17 and the rear towing hitch 18. The front end 22 is adapted for releasable coupling engagement with a conventional socket 24 of the towing hitch 18. Thus, the tow bar 21 is, as shown, preferably comprised of tubular steel stock that is cross-sectionally rectangular (preferably substantially square) as is the conventional socket 24 defined at the rear of the towing hitch 18. The front end 22 of the tow bar 21 is telescopically engageable with and matingly receivable in the open rear end of the socket 24. The front end 22 and the socket 24 are each provided with alignable holes through which one or even two conventional removable coupling cross pins 27 are transversely extendable, thereby making the tow bar 21 drawable relative to the towing hitch 18.

The towing hitch extension 15 incorporates the supporting arm 132 which is elongated and transversely and horizontally extends. It is fastened medially across and adjacent an upper or a lower side of the arm 26 against and adjacent the rear end 23. The cross bar 132 extends generally and preferably straight, but is oriented transversely relative to the towing vehicle 17. Preferably, and as shown, the cross bar 132 is comprised of a cross-sectionally rectangular (preferably substantially square) tubular steel stock. Various means for fastening the cross bar 132 to the tow bar 21 can be employed, as those skilled in the art will readily appreciate, but preferably welding is employed. Conveniently and preferably, the opposite ends of the cross bar 132 are fitted with closing caps 34 which can be comprised of a molded plastic, welded steel plating or sheeting, or the like. Preferably, the cross-sectional size of the cross bar 132 and the receiver socket 28 each approximately corresponds to the cross-sectional size of the tow bar 21, and preferably the cross-sectional size of the cross bar 132 is such that it can slidably engage and extend through a sleeve 122.

A trailer hitch receiver, which is preferably a socket 28 (as shown, but not detailed, for example, in FIG. 1), is mounted preferably adjacent to, and vertically over, the rear end 23 of the tow bar 21. Various alternative configurations and mounting means can be used, if desired. Here, the hitch receiver socket 28 preferably (as shown) comprises a relatively short, straight length of cross-sectionally rectangular (preferably substantially square) steel tubing that is mounted adjacent and parallel to the tow bar 21, a presently preferred mounting arrangement being further explained below. The mounting means for the receiver socket 28 can be mechanical (such as bolts, rivets, or the like) or can be welding (preferred). The hitch receiver socket 28 is oriented so that its socket mouth 25 rearwardly opens and is adapted to telescopically engage and matingly receive the base or connection portion of a conventional hitch ball mount assembly 31. The ball 33 of assembly 31 (not detailed) is adapted to be engaged with a conventional hitch tongue 35 (not detailed) of a towed trailer or the like (not shown). If desired, for purposes of aligning the towing hitch extension 15 and the receiver socket 28 with the hitch ball mount assembly 31 as associated with a particular towed vehicle, the orientation of the towing hitch extension 15 can be reversed from the preferred upright configuration by inverting the association of the tow bar 21 with the towing hitch 18.

Preferably, and as shown, the towing hitch extension 15 includes brace means to rigidify the cross bar 132 relative to the tow bar 21. Various types and forms of bracing may be employed. Preferably, in the towing hitch extension 15, the brace means comprises a pair of metal, preferably steel, plate members 39 that are positioned one above the other on opposing sides of the cross bar 132 and the tow bar 21 in the region where the bars 132 and 21 abuttingly interconnect. For purposes of convenient overfitting of the tow bar 21 and the supporting arm or cross bar 132, the pair of plate members 39 each preferably have a hexagonal perimeter configuration that is adapted to rest adjacent portions of the cross bar 132 and the tow bar 21. Thus, in the preferred embodiment 15 shown, one side of each plate 39 extends parallel to the back side of the cross bar 132 while the opposite side of each plate 39 extends across and over the tow bar 21 in spaced, adjacent relationship to the rear end 23 with the local plate width at this opposite side being about equal to the width of the tow bar 21, and with the local width of the side of each plate 39 over the cross bar 132 being about equal to the width of the cross bar 132. Preferably, vertically adjacent surface portions of the plates 39 relative to the cross bar 132 and the tow bar 21 are welded together. Various plate configurations can be employed.

Preferably, the under surface of the trailer hitch receiver socket 28 rests against outside surface portions of the top plate 39, and preferably the trailer hitch receiver socket 28 is welded to the plate 39. Optionally but preferably, the edge portions of the open end of each trailer hitch receiver socket 28 and 24 are provided with a protective edge facing (preferably a metal sleeve).

The towing hitch extension 15 is preferably provided with a pair of guard projections 36 and 37 that are preferably toe hooks and that each upstand from the cross bar 132. Each projection 36, 37 is connected to the cross bar 132 in laterally spaced but adjacent relationship relative to a different respective opposite longitudinal side of the tow bar 21. Various means for connection to the cross bar 132 can be employed, such as screws or welding (preferred). For example, when the projections comprise tow hooks 36, 37, a bolt (not shown) can be extended through a hole in each hook 36, 37 and threadably engaged with a mating threaded hole provided in the upper side of the cross bar 132. A lock washer (not shown) can be placed on the shank of each bolt, if desired. However, welding is preferred.

Each hook 36, 37 is preferably transversely oriented relative to the arm or cross bar 132 so that the hook portion 46, 47 thereof is forwardly opening and so that the base portion 48, 49 thereof is flattened and extends transversely across, against and over an upper surface portion of the cross bar 132. Thus, each hook portion 46, 47 is spatially oriented so that it initially curves upwards rearwardly and then has its hook end terminate above and in spaced adjacent relationship to adjacent portions of the draw bar 132. When the base portion 48, 49 of each hook 36, 37 is flattened, it rests upon an adjacent upper side surface portion of the cross bar 132. However, various structures can be employed as the guard projections 36, 37, including but not limited to metal rod sections, and the like.

When two tow hooks are used as guard protectors, preferably each tow hook 36, 37 has a base or bottom portion 48, 49 that is provided with a region that extends forwardly beyond the cross bar 132 and has an aperture therethrough that is adapted to receive and engage with a terminal end portion (which can be configured as an S-hook or the like) of a safety chain 56 that is associated with a towed trailer or the like. Typically, a mid-region of the safety chain 56 is engaged with a portion of a towed vehicle having a connecting hitch with a tongue that is engaged with the ball mount 31 that is connected to the hitch socket 28.

As is conventional, the hitch ball mount assembly 31 is provided with a resting support jack assembly 54 which is adapted. to adjust the elevation of the assembly 31 and/or level the towed vehicle during storage thereof, as those familiar with vehicle towing will appreciate.

The utility and operative effect of a protective cushion assembly 120 is illustrated in FIG. 8. The combination of FIG. 1 is partially illustrated in a configuration where the towing vehicle (not shown) has been turned at an angle relative to the towed vehicle (not shown) to an extent that the cushion or elastomeric plastic body 121 of the protective cushion assembly 120 is abutted against one of the support and positioning arm members 41 of the hitch ball mount assembly 31 associated with the towed vehicle, thereby absorbing what would otherwise be an impact between the arm 132 and the arm member 41 and preventing contact therebetween.

FIG. 8 also illustrates the advantage of having the mounting bracket 126 preferably located adjacent one end of a protective cushion assembly 120 (as shown in the figures), because, with the mounting bracket 126 so located, one can simply invert a protective cushion assembly 120 and shift its spatial vertical position after the sleeve 122 is engaged with the arm 132. Such a shift provides adjustability for the protective cushion assembly 120 as associated with the arm 132, as is desirable for enabling the elastomer plastic body 121 to be positioned so as to abut against a particular adjacent equipment component when a towing vehicle is angled relative to a towed vehicle. As those skilled in the art will readily appreciate, in view of variations between equipment components, the exact location of impact between components frequently cannot be predicted for all pieces of vehicular towing equipment, so that the capability for adjustment is desirable.

The inventive protective cushion assembly can be variously embodied. Referring to FIG. 11, there is seen an alternative embodiment 140 of a protective cushion assembly. Components of embodiment 140 which are similar to those of embodiment 120 are similarly numbered but with the addition of prime marks for identification purposes. The elastomeric plastic body 121' has a base wall 123' that is bonded to one face of a metal base plate 125' by means of an adhesive (not detailed but conventional). The embodiment 140 incorporates a two component bracket assembly 141. One component 142 of the bracket assembly 141 is a cross sectionally L-shaped plate member whose short leg 142A perpendicularly outstands from the base plate 125' with the short leg 142A terminal end portion being welded to and across a mid-region of the base plate 125' while the long leg 142B thereof extends parallel to but spaced from the base plate 125' and has a plurality of holes 143 defined therethrough. The holes 143 are conveniently and preferably longitudinally aligned with one another (relative to the long leg) and are equally spaced along the mid-region of the long leg 142B.

The second component 145 of the bracket assembly 141 is a cross-sectionally U-shaped plate member whose spaced, opposed pair of side legs 145A are adapted to fit between and to slidably engage respective adjacent surface portions of the base plate 125' and the long leg 142B of the L-shaped component 142 with the base 145B of the U-shaped component 145 extending perpendicularly therebetween. Each of these side legs 145A has a plurality of holes 146 defined therethrough. In each side leg 145A, the holes 146 are conveniently longitudinally aligned with one another (relative to a side leg 145A) and are equally spaced along the mid-region of each side leg 145A.

The holes 146 are each sized to receive therein the hex head 147A of the bolt of a nut and bolt assembly 147. The head 147A is preferably about equal to the thickness of each of the walls of a side leg 145A in U-shaped component 145. The holes 143 are alignable with the holes 146, but the holes 143 are sized only to slidably accommodate the shank 147B of the bolt of a nut and bolt assembly 147.

Thus, when a bolt of the nut and bolt assembly 147 is extended through a pair of aligned holes 143 in long leg 142A and 146 in an adjacent side leg 145A, with the head 147A seated in the hole 146, the position of the U-shaped component 145 relative to the associated L-shaped component 142 becomes fixed when the nut 147C on the shank 147B is tightened against adjacent surface portions of the long leg 142B. A similar result is achieved when a nut and bolt assembly 147 is extended through aligned holes 146 in the other side leg 145A and a hole 148 provided through the base plate 125' and the base 123'. To aid in setting the position of the U-shaped component 145 relative to the base plate 125', the base plate 125' can be provided with a shallow recess about the hole 148 therethrough (as shown in FIG. 11), thereby enabling the head 147A to be partially received therein and thus seated. Thus, the interior dimensions of the central orifice defined by the assembled bracket assembly 141 can be adjusted, thereby enabling the bracket assembly 141 to accommodate and associate supporting arms of various dimensions.

Referring to FIG. 12, there is seen another alternative embodiment 150 of a protective cushion assembly. Components of embodiment 150 which are similar to those of embodiment 140 are similarly numbered but with the addition of prime marks for convenient identification purposes. The elastomeric plastic body 121' has a base wall 123' that is bonded to one face of a metal base plate 125' by means of an adhesive (not detailed but conventional). The embodiment 150 incorporates a two component bracket assembly 141'. One component 142' of the bracket assembly 141' is a cross sectionally L-shaped plate member whose short leg 142A' perpendicularly outstands from the base plate 125' with the short leg 142A' terminal end portion being welded to and across a mid-region of the base plate 125' while the long leg 142B' thereof extends parallel to but spaced from the base plate 125' and has a single hole 151 defined therethrough centrally.

The second component 145' of the bracket assembly 141' is a cross-sectionally U-shaped plate member whose spaced, opposed pair of side legs 145A'. One leg 145A' is adapted to fit slidably adjacent to wall portions of the base plate 125', and the other leg 145A is adapted to fit slidably adjacent to the outside face of the long leg 142B' of the L-shaped component 142'. The base 145B' of the U-shaped component 145 extends perpendicularly between the side legs 145A'. Each of these side legs 145A' has a similar L-shaped slot 152 defined therein, the slots 152 being in spaced, parallel relationship relative to each other. The terminal end of the short leg 152A of each slot 152 opens along a corresponding side of each side leg 145A. The hex head 153A of a nut and bolt assembly 153 is adapted to matingly engage the matingly configured hole 151, and the shank 153B of the nut and bolt assembly extends perpendicularly outwards from the long leg 142B'. The head 153A is mounted in the hole 151 preferably by welding (not detailed) with the inside face of the long leg 124' being smooth but the head 153A projecting from the outside face of the long leg 124'. Similarly, a hole 154 is defined in base plate 125' that extends through the adjacent base wall 123', the hole 154 being coaxial with the hole 151. The hex head 153A of a nut and bold assembly 153 is positioned in the matingly engageable hole 154 with the head 153A projecting outwardly from the adjacent face of the base plate 125'. This head 153A is likewise mounted in the hole 154 preferably by welding (not detailed). The slots 152 are each slidably engageable with a different head 153A.

When each of the slots 152 of each side leg 145A' of the U-shaped component 145' is slidably engaged with a different bolt head 153A and is moved so that the long portion 152B of each slot 152, the nut 153C on the shank 153B that projects outwardly through the adjacent side leg 145A' can be tightened against the side leg 145A' to fix or set the position of the U-shaped component 145' relative to the L-shaped component 142'. Thus, the interior dimensions of the central orifice defined by the assembled bracket assembly 141' can be adjusted, thereby enabling the bracket assembly 141' to accommodate and associate supporting arms of various dimensions.

FIG. 13 shows another alternative embodiment 160 of a protective cushion assembly. Components of embodiment 160 which are similar to those of embodiment 120 are similarly numbered but with the addition of prime or double prime marks for identification purposes. The protective cushion assembly 160 incorporates first and second elastomeric bodies 121' and 121", respectively, each comparable to the elastomeric body 121 of embodiment 120. Each body 121' and 121" is associated with a different base plate 125' and 125" which is comparable to the base plate 125 of embodiment 120. Each base plate 125' and 125" is mounted to its adjacent respective elastomeric body 121' and 121" similarly to the manner in which body 121 is mounted to base plate 125 in embodiment 120.

The respective base plates 125' and 125" are each associated with a different opposite side of a sleeve 122' which is comparable to the sleeve 122 of embodiment 120 by welding or the like. Thus, the respective elastomeric plastic bodies 121' and 121" face in opposite directions relative to each other. An open side of the sleeve 122' is provided with a threadably associated set bolt 133', a plate washer 134' and a set nut 135", comparably to corresponding respective components in embodiment 120, thereby enabling the fixing of the position of the embodiment 160 along a cross bar 132' with which the sleeve 122' is slidably engaged. Thus, in use, if one elastomeric plastic body 121' is impacted to an extent that the cross bar 132' is deflected, then the elastomeric plastic body 122' cushions and absorbs the impact energy, thereby avoiding damage to a component adjacent to the cross bar 132'.

Referring to FIG. 10, a supporting arm arrangement is shown where two embodiments 120 are associated at each opposite end of a cross arm 60 that is medially connected across a tow bar 61. A pair of tubular mounting studs 63 and 64 is provided in opposed relationship on each side of the tow bar just forward of the hitch ball 62, the studs 63 and 64 being engaged by welding or the like. Each mounting stud 63, 64 is adapted to be slidably engaged over the outer end of a tubular cross arm section, each section being identified as 60L and 60R, respectively (relative to the driver of the towing vehicle, not detailed). To lock each section 60L and 60R to its engaged stud 63 or 64, a locking pin 69 is provided on each side, each pin 69 being extended through mating holes 70 extending between each mounting stud and its engaged section. A cushion assembly 120 is engaged at the outer end of each section 60L and 60R.

Figure 14:
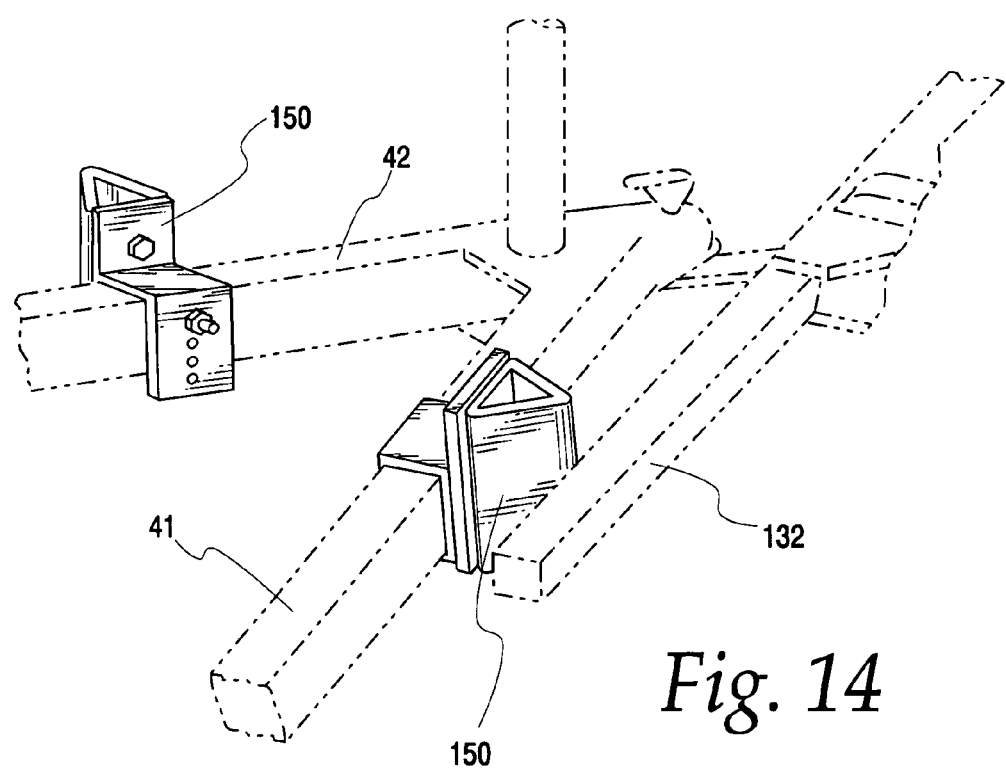
FIG. 14 is a view comparable to FIG. 8 but showing the alternative embodiment of the protective cushion assembly of FIG. 12 associated with each of the two support and positioning arm members of the towed vehicle's hitch ball connector.

Referring to FIG. 14, there is seen an arrangement similar to that shown in FIG. 8 but including a pair of cushion assemblies 150, each assembly 150 being engaged with a different one of the two support and positioning arms 41 and 42 of a hitch ball connector 30 associated with a towed vehicle. The location of each assembly 150 is such that when the towing vehicle (not detailed) is turned at an angle relative to the towing vehicle, one of the cushion assemblies 150 engages the adjacent supporting arm 132, thus averting an impact and possible damage.

Numerous structural and functional modifications and adaptations may be achieved, as those of ordinary skill in the art will readily appreciate, without departing from the spirit and scope of the invention.

What is claimed is:

1. A vehicular protective cushion assembly for association with an arm that laterally extends outwardly from the region of a vehicle-associated towing hitch, said cushion assembly comprising in combination:

an elastomeric plastic body for absorbing impacts;
a bracket for associating said body with a portion of said arm; and
said body having a back side portion and a front side portion and where a backing plate is located between said back side portion and said bracket;
a joining member, comprising a nut and a bolt, which joins together said backing plate and said body; and
a connecting member for connecting said backing plate to said bracket.

2. The assembly of claim 1 where said body and said backing plate are each laterally elongated, said backing plate extends over said back side portion, and said body and said backing plate extend laterally beyond said bracket.

3. The assembly of claim 1 wherein said bracket includes an adjusting member for selectably associating said bracket with a point along said arm.

4. The assembly of claim 1 wherein said connecting member comprises weldments.

5. The assembly of claim 1 wherein said bracket comprises:

a sleeve having side walls that define an internal passage which adapts said sleeve for slidable engagement with portions of said arm; and said sleeve includes an adjustable retaining member for retaining said sleeve at a fixed location along a portion of said arm.

6. The assembly of claim 5 wherein said connecting member connects a portion of said side walls with said backing plate.

7. The assembly of claim 5 wherein said internal passage is oriented perpendicularly relative to the direction of said lateral elongation of said body and said backing plate.

8. The cushion assembly of claim 1 wherein said body:
is unitarily formed;
is relatively rigid but distortable and resilient in response to impact;
has a triangular transverse vertical cross section;
is elongated longitudinally and hollow, and defines a back wall and a pair of inclined side walls; and
each of said walls has a generally rectangular exterior perimeter when viewed in elevation.

9. The assembly of claim 1 further comprising an arm which comprises a horizontally oriented, elongated cross bar that extends transversely across and medially adjoins the rear end portion of a tow bar.

10. The assembly of claim 9 wherein said arm comprises a rear bumper of a towing vehicle.

11. The assembly of claim 9 wherein said arm comprises a support and positioning arm member of a hitch ball connector connected to a towed vehicle.

12. The assembly of claim 9 wherein said arm is a component of a towing hitch extension for detachable attachment to a rear towing hitch of a towing vehicle, said towing hitch extension comprising in combination:
a tow bar having front and rear ends;
a front coupling at said front end for releasable coupling engagement with said towing hitch;
said arm transversely extends across, is horizontally oriented and elongated, and medially adjoins said rear end; and
a rearwardly opening towing hitch socket mounted at said rear end and vertically offset relative to said tow bar and said arm.

13. A vehicular protective cushion assembly for association wit an arm that laterally extends outwardly from the region of a vehicle-associated towing hitch, said cushion assembly comprising in combination:
a first elastomeric plastic body for absorbing impacts, said body having a back side portion;
a first rigid backing plate for said first body located adjacent said backside portion, including a first joining member for joining said first backing plate to said first back side portion; a bracket comprising:
a sleeve with side wall portions tat define an aperture that is engageable around portions of said arm;
a connecting member for connecting said sleeve with said first backing plate; and
an adjustable retaining member for retaining said sleeve at a fixed location at a selected portion of said arm.

14. The assembly of claim 13 wherein said first elastomeric body and said backing plate are each rectangularly configured and said bracket is located adjacent an end portion of said backing plate.

15. A combination of a protective cushion assembly and a towing hitch extension, said cushion assembly comprising in combination:
an elastomeric plastic body for absorbing impacts, said body having a backside;
a rigid backing plate for said body located adjacent a portion of said backside,
a joining member for joining said backing plate to said backside; and
a bracket comprising:
a sleeve with side wall portions that are engageable around portions of said arm;
a connecting member for connecting said sleeve with said backing plate; and
an adjustable retainer for retaining said sleeve at a fixed location at a selected portion of said arm;
said towing hitch extension comprising in combination:
a tow bar having front and rear ends;
a front coupling at said front end for releasable coupling engagement with said towing hitch;
a cross bar that transversely extends across, is horizontally oriented and elongated, and medially adjoins said rear end;
a rearwardly opening towing hitch socket that is mounted at said rear end and that is vertically offset relative to said tow bar and said cross bar; and
said sleeve being associated with one end portion of said cross bar, and said adjustable retainer retains said sleeve at a fixed location on said cross bar.

16. A cushioned towing hitch extension adapted to protect the rear bumper of a towing vehicle for detachably attaching to a rear towing hitch of a towing vehicle; said towing hitch extension comprising in combination:
a tow bar having front and rear ends;
a front coupling at said front end for releasable coupling engagement with said towing hitch;
a transversely extending, horizontally oriented, elongated cross bar extending across and medially adjoining said rear end;
a rearwardly opening towing hitch socket mounted at said rear end and vertically offset relative to said tow bar and said cross bar; and
at least one protective cushion assembly associated with said cross bar, each said cushion assembly comprising in combination:
an elastomeric plastic body for absorbing impacts, said body having a backside;
a rigid backing plate for said body located adjacent a portion of said backside, including a joining member for joining said backing plate to said backside; and
a bracket comprising
a sleeve with side wall portions that are engaged around portions of said bar;
a connecting member for connecting said sleeve with said backing plate; and
an adjustable retainer for retaining said sleeve at a fixed location of said bar.

17. A vehicular protective cushion assembly for association with an arm that laterally extends outwardly from the region of a vehicle-associated towing hitch, said cushion assembly comprising in combination:
an elastomeric plastic body for absorbing impacts, said body having a back side portion and a front side portion and including a backing plate;
a bracket for associating said body with a portion of said arm, said backing plate disposed between the back side portion and the bracket; and
a first member for joining together the backing plate and the body and a second member for connecting the backing plate to the bracket;
said bracket comprising a sleeve having side walls that define an internal passage which adapts the sleeve for slidable engagement with portions of the arm, the sleeve including an adjustable retaining member for retaining the sleeve at a fixed location along a portion of the arm.

18. The assembly of claim 17 wherein the second member connects a portion of the side walls with the backing plate.

19. The assembly of claim 17 wherein the internal passage is oriented perpendicularly relative to the direction of the lateral elongation of the body and the backing plate.

20. A vehicular protective cushion assembly for association with an arm that laterally extends outwardly from the region of a vehicle-associated towing hitch, said cushion assembly comprising in combination:

an elastomeric plastic body for absorbing impacts, said body having a back side portion and a front side portion and including a backing plate;

a bracket for associating said body with a portion of said arm, said backing plate disposed between the back side portion and the bracket;

a first member for joining together the backing plate and the body and a second member for connecting the backing plate to the bracket; and an arm which comprises a horizontally orientated, elongated cross bar that extends transversely across and medially adjoins the rear end portion of a tow bar.

21. The assembly of claim 20 wherein the arm comprises a rear bumper of a towing vehicle.

22. The assembly of claim 20 wherein the arm comprises a support and positioning arm member of a hitch ball connector connected to a towed vehicle.

23. The assembly of claim 20 wherein the arm is a component of a towing hitch extension for detachable attachment to a rear towing hitch of a towing vehicle, the towing hitch extension comprising in combination:

a tow bar having front and rear ends;

a front coupling at the front end for releasable coupling engagement with the towing hitch;

the arm transversely extends across, is horizontally orientated and elongated, and medially adjoins the rear end; and a rearwardly opening towing hitch socket mourned at the rear end and vertically offset relative to the tow bar and the arm.

24. A vehicular protective cushion assembly for association with an arm that laterally extends outwardly from the region of a vehicle-associated towing hitch, said cushion assembly comprising in combination:

an elastomeric plastic body for absorbing impacts, said body having a back side portion and a front side portion and including a backing plate;

a bracket for associating said body with a portion of said arm, said backing plate disposed between the back side portion and the bracket; and a first member for joining together the backing plate and the body and a second member for connecting the backing plate to the bracket;

wherein the body is unitarily formed; is relatively rigid but distortable and resilient in response to impact; has a triangular transverse vertical cross section; is elongated longitudinally and hollow, and defines a back wall and a pair of inclined, side walls; and each of the walls has a generally rectangular exterior perimeter when viewed in elevation.

* * * * *

UNITED STATES PATENT AND TRADEMARK OFFICE
CERTIFICATE OF CORRECTION

PATENT NO. : 7,237,792 B2  Page 1 of 1
APPLICATION NO. : 10/870332
DATED : July 3, 2007
INVENTOR(S) : Robert Mrofka and Ted Kowalski It is certified that error appears in the above-identified patent and that said Letters Patent is hereby corrected as shown below:

Column 7, line 28, change "adapted. to" to -- adapted to --

Column 11, line 42, change "wit" to -- with --

Column 11, line 51, change "tat" to -- that --

Signed and Sealed this

Sixteenth Day of October, 2007

JON W. DUDAS
*Director of the United States Patent and Trademark Office*